(12) United States Patent
Perez

(10) Patent No.: US 10,084,820 B2
(45) Date of Patent: *Sep. 25, 2018

(54) METHOD AND SYSTEM FOR IPSEC SECURITY FOR IPP-USB DATA

(71) Applicant: KONICA MINOLTA LABORATORY U.S.A., INC., San Mateo, CA (US)

(72) Inventor: Maria Perez, Half Moon Bay, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/633,941

(22) Filed: Feb. 27, 2015

(65) Prior Publication Data

US 2016/0255062 A1  Sep. 1, 2016

(51) Int. Cl.
| | |
|---|---|
| *H04L 29/06* | (2006.01) |
| *G06F 21/60* | (2013.01) |
| *H04L 12/40* | (2006.01) |

(52) U.S. Cl.
CPC ............ *H04L 63/20* (2013.01); *G06F 21/608* (2013.01); *H04L 12/40* (2013.01); *H04L 63/0254* (2013.01); *H04L 63/0428* (2013.01); *H04L 63/0485* (2013.01); *H04L 63/164* (2013.01)

(58) Field of Classification Search
CPC ............................... H04L 63/164; G06F 21/34
USPC .................................................. 713/150, 168
See application file for complete search history.

(56) References Cited

U.S. PATENT DOCUMENTS

| | | | | |
|---|---|---|---|---|
| 2005/0223228 | A1* | 10/2005 | Ogawa | H04L 63/061 713/168 |
| 2006/0029062 | A1* | 2/2006 | Rao | H04L 12/2856 370/389 |
| 2007/0160200 | A1* | 7/2007 | Ishikawa | H04L 63/0428 380/30 |

(Continued)

OTHER PUBLICATIONS

Extended European Search Report dated Jul. 11, 2016 by the European Patent Office in corresponding European Patent Application No. 15194709.0.

(Continued)

*Primary Examiner* — Morshed Mehedi
*Assistant Examiner* — Dereena T Cattungal
(74) *Attorney, Agent, or Firm* — Buchanan Ingersoll & Rooney PC

(57) ABSTRACT

A method of providing security for data being transferred over a Universal Serial Bus (USB) connection, the method comprising: setting an IPsec policy configuration on a host device hand a client device; sending a packet to a first loopback interface on the host device, wherein the first loopback interface configures the packet to be routed to a second loopback interface on the client device; sending the packet from the first loopback interface to an IPsec module for encryption; filtering the packet received from first loopback interface; sending the packet to the client device over the USB connection; injecting the packet into the second loopback interface; sending the packet from the second loopback interface on the client device to the IPsec module on the client device for decryption; and sending the decrypted packet to the second loopback interface on the device application, wherein the packet is received on the client device.

20 Claims, 2 Drawing Sheets

(56) References Cited

U.S. PATENT DOCUMENTS

| | | | |
|---|---|---|---|
| 2008/0028203 A1* | 1/2008 | Sakai | H04L 63/164 713/150 |
| 2008/0189556 A1 | 8/2008 | Modica et al. | |
| 2008/0192930 A1* | 8/2008 | Balissat | H04L 63/0209 380/255 |
| 2009/0002743 A1* | 1/2009 | Park | G06F 21/608 358/1.14 |
| 2010/0131753 A1 | 5/2010 | Ha | |
| 2011/0161665 A1* | 6/2011 | Perez | H04L 29/12028 713/161 |
| 2011/0265156 A1* | 10/2011 | Bombay | G06F 21/34 726/5 |
| 2013/0042029 A1* | 2/2013 | Lu | G06F 21/57 710/15 |
| 2013/0072260 A1* | 3/2013 | Nair | G06F 13/102 455/566 |
| 2013/0201519 A1* | 8/2013 | Duyk | H04L 12/46 358/1.15 |
| 2015/0058975 A1* | 2/2015 | Raskin | G06F 21/85 726/22 |
| 2015/0365237 A1* | 12/2015 | Soffer | G06F 21/85 726/20 |

OTHER PUBLICATIONS

Smart Cards; Secure Channel between UICC and an end-point terminal (Release 11), Technical Specification, European Telecommunications Standards Institute (ETSI), vol. SCP TEC, No. V11.1.0, Oct. 1, 2013, pp. 1-31.

* cited by examiner

METHOD AND SYSTEM FOR IPSEC SECURITY FOR IPP-USB DATA

FIELD OF THE INVENTION

The present disclosure relates to a method and system for IPSec security of IPP-USB data (Internet Printing Protocol-Universal Serial Bus data), and more particularly, a method and system for securing and transmitting a HTTP/IPP USB protocol from a host device to a client device.

BACKGROUND OF THE INVENTION

Networks have enhanced our ability to communicate and access information by allowing one personal computer to communicate over a network (or network connection) with another personal computer and/or other networking devices, using electronic messages. When transferring an electronic message between personal computers or networking devices, the electronic message will often pass through a protocol stack that performs operations on the data within the electronic message (e.g., packetizing, routing, flow control).

Internet Protocol Security (IPsec) is a protocol suite for securing Internet Protocol (IP) communications by authenticating and encrypting each IP packet of a communication session. IPsec can include protocols for establishing mutual authentication between agents at the beginning of the session and negotiation of cryptographic keys to be used during the session. In addition, IPsec can be used in protecting data flows between a pair of hosts (host-to-host), between a pair of security gateways (network-to-network), or between a security gateway and a host (network-to-host).

Internet Protocol security (IPsec) uses cryptographic security services to protect communications over Internet Protocol (IP) networks. IPsec can support network-level peer authentication, data origin authentication, data integrity, data confidentiality (encryption), and replay protection.

SUMMARY OF THE INVENTION

In accordance with an exemplary embodiment, a method is disclosed of providing security for data being transferred over a Universal Serial Bus (USB) connection, the method comprising: setting an IPsec policy configuration on a host device and a client device, the IPsec policy configuration including a first loopback interface and an IP address for the host device and a second loopback interface and an IP address for the client device; sending a packet to the first loopback interface on the host device, wherein the first loopback interface configures the packet to be routed to the second loopback interface; sending the packet from the first loopback to an IPsec module on the host device for encryption; filtering the packet received from first loopback interface; sending the packet to the client device over the USB connection; injecting the packet into the second loopback interface on the client device; sending the packet from the second loopback interface on the client device to the IPsec module on the client device for decryption; and sending the decrypted packet to the second loopback interface on the device application, wherein the packet is received on the client device.

In accordance with an exemplary embodiment, a non-transitory computer readable medium containing a computer program having computer readable code embodied to carry out a method of providing security for data being transferred over a Universal Serial Bus (USB) connection is disclosed, the method comprising: setting an IPsec policy configuration on a host device and a client device, the IPsec policy configuration including a first loopback interface and an IP address for the host device and a second loopback interface and an IP address for the client device; sending a packet to the first loopback interface on the host device, wherein the first loopback interface configures the packet to be routed to the second loopback interface; sending the packet from the first loopback interface to an IPsec module on the host device for encryption; filtering the packet received from first loopback interface; sending the packet to the client device over the USB connection; injecting the packet into the second loopback interface on the client device; sending the packet from the second loopback interface on the client device to the IPsec module on the client device for decryption; and sending the decrypted packet to the second loopback interface on the device application, wherein the packet is received on the client device.

In accordance with an exemplary embodiment, a system is disclosed for providing security for data being transferred over a Universal Serial Bus (USB) connection, the system comprising: a USB connection; a host device, the host device having a host application configured with an IPsec policy including a first loopback interface and an IP address for the host device; and a client device, the client device having a second loopback interface and an IP address for the client device, and wherein the host device and the client device are configured to: send a packet to the first loopback interface on the host device, wherein the first loopback interface configures the packet to be routed to the second loopback interface; send the packet from the first loopback interface to an IPsec module on the host device for encryption; filter the packet received from first loopback interface; send the packet to the client device over the USB connection; inject the packet into the second loopback interface on the client device; send the packet from the second loopback interface on the client device to the IPsec module on the client device for decryption; and send the decrypted packet to the second loopback interface on the device application, wherein the packet is received on the client device.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
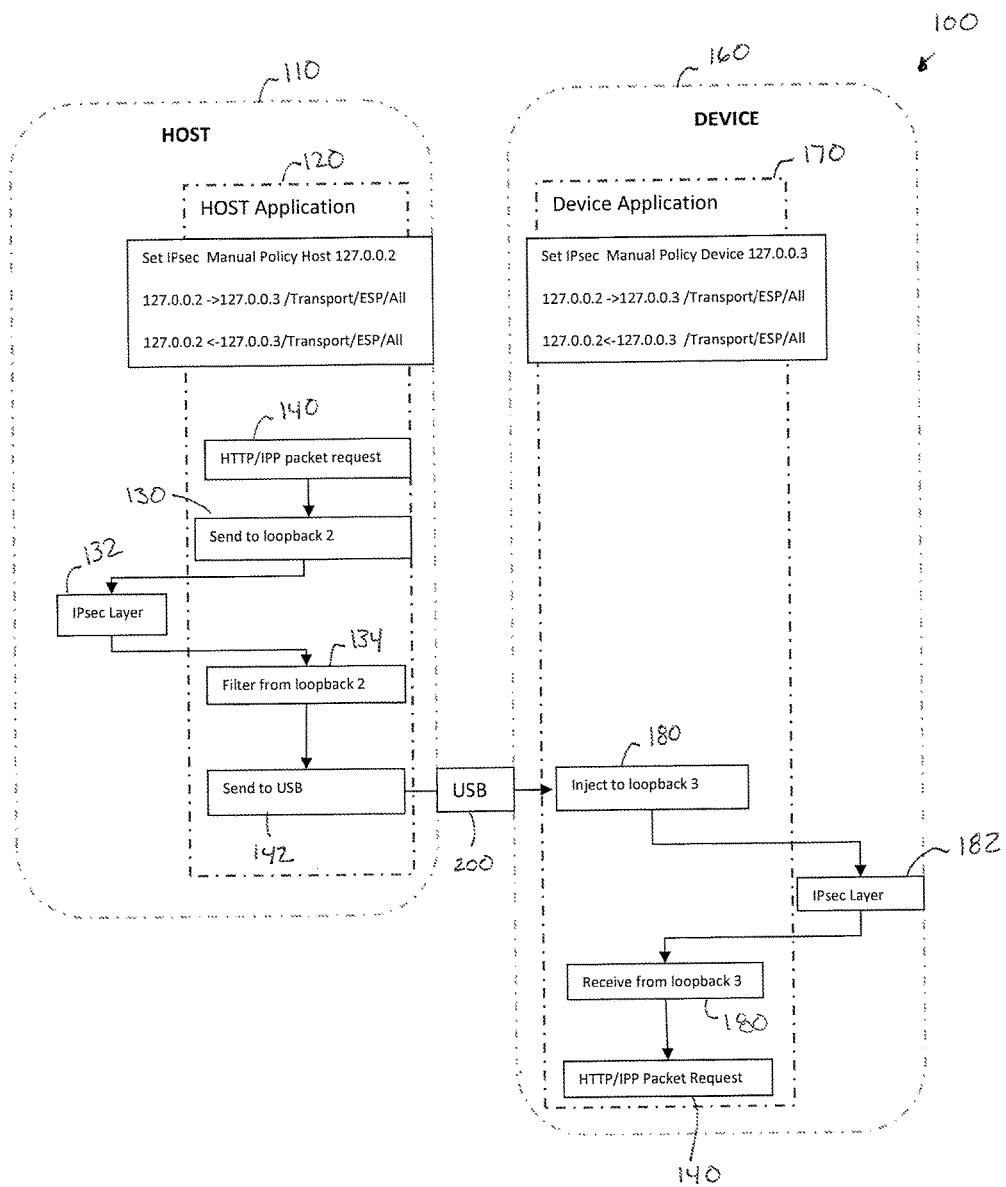
FIG. 1 is an illustration of a manual key configuration for IPSec having automatic key configuration from a host device to a client device in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, the IPSec protocol can be implemented for securing and transmitting the HTTP/IPP USB protocol from a USB Host to a USB Device. In accordance with an exemplary embodiment, since the packets are not network packets, the host device 110 can send the packets on the USB connection 200, for example, which can be a wire or USB cable without any encryption or authentication. Since the USB connection 200 can be easily detached and a capture device, for example, with Wi-Fi can be used to access the printing data.

In accordance with an exemplary embodiment, for example, when an IPSec protocol is used, the data can be encrypted as if the data was part of the network, yet the data does not use network stack. In addition, only the host device 110 and the client device 160 can decrypt the data and communicate.

FIG. 1 shows a network system 100 having a normal communication protocol, which includes a host device 110 and a client device 160. In accordance with an exemplary embodiment, the host device 110 can be connected to the client device 160 by a USB connection 200.

In accordance with an exemplary embodiment, the host device 110 may be embodied by a printer, a Multi-Function Printer (MFP), an image forming apparatus and other known apparatuses, which prints an image on a printing medium (or a recording medium) such as a sheet of paper based on printing data generated by the at least one client device 160. In accordance with an exemplary embodiment, the host device 110 is a Multi-Function Printer (MFP), which includes at least a copy function, an image reading function, and a printer function, and forms an image on a sheet based on a print job (print instruction) sent from the at least one second host (or client device) 160, image data read by an image reading section, such as a scanner, provided in the host device (or image forming apparatus) 110, or the like.

In accordance with an exemplary embodiment, the host device 110 can be a multifunction printer (MFP). The host device 110 can include a printer controller (or firmware), a memory section preferably in the form of a hard disk drive (HDD), an image processing section (or data dispatcher), a print engine, and an input/output (I/O) section.

The controller of the host device 110 can include a central processing unit (CPU), a random access memory (RAM), and a read only memory (ROM). The central processing unit can be configured to execute a sequence of stored instructions (e.g., a computer program). It can be appreciated that the controller also includes an operating system (OS), which acts as an intermediary between the software programs and hardware components within the host device 110. The operating system (OS) manages the computer hardware and provides common services for efficient execution of various application software. In accordance with an exemplary embodiment, the controller processes the data and job information received from the client device 160 and generates a print image.

The image processing section carries out image processing under the control of the controller, and sends the processed print image data to the print engine. The image processing section is preferably capable of processing multiple print jobs or sub-jobs in parallel and independently. For instance, the image processing section can include a CPU that contains multiple cores therein to realize the multiple RIP modules explained in detail later. The CPU used constituting a part of the controller can be commonly used for the image processing section. The print engine forms an image on a recording sheet based on the image data sent from the image processing section. The I/O section performs data transfer with the client device 160. The controller can be programmed to process data and control various other components of the multifunction printer or printer 110 to carry out the various methods described herein. The hard disk drive (HDD) or storage device stores digital data and/or software programs for recall by the controller. In accordance with an exemplary embodiment, the digital data includes resources, which can include graphics/images, logos, form overlays, fonts, etc.

Examples of a host device 110 in the form of a multifunction printer (MFP) or printer consistent with exemplary embodiments include, but are not limited to, a laser beam printer (LBP), a multifunction laser beam printer including copy function, an ink jet printer (IJP), a thermal printer (for example, a dye sublimation printer) and a silver halide printer. For example, the multifunction printer or printer can be a color printer or a black and white (B/W) printer.

In accordance with an embodiment, the at least one client device 160, which may be embodied by a computer system, and generates the printing data usable in the host device 110 and transmits the generated printing data to the host device 110. An example of the at least one client device 160 may include a computer and/or a portable device such as a notebook personal computer, a cellular phone and a personal digital assistant (PDA). The host device 110 and the at least one client device 160 can constitute an image forming system to install a communication port, to generate printing data, and to perform a printing operation of forming an image on a printing medium according to the printing data.

In accordance with an exemplary embodiment, the client device 160 can be a plurality of personal computers, and has the function of sending a print job to the host device 110 in the form of a multifunction printer (MFP) or an image forming apparatus. A printer driver program (hereinafter, sometimes simply referred to as a printer driver) is installed in the client device 160, and the client device 160 uses the function of the printer driver to generate a print job including the data of print conditions to be applied at the time of image formation, image data, and the like, and to send the generated print job to the host device 110 in the form of a multifunction printer.

In accordance with an exemplary embodiment, the client device 160 can include a processor or central processing unit (CPU), and one or more memories for storing software programs and data (such as files to be printed). The processor or CPU carries out the instructions of a computer program, which operates and/or controls at least a portion of the functionality of the client device 160. The client device 160 can also include an operating system (OS), which manages the computer hardware and provides common services for efficient execution of various software programs. For example, the software programs can include application software and printer driver software. For example, the printer driver software controls a multifunction printer or printer, for example, the host device 110 connected with the client device 160 in which the printer driver software is installed. In certain embodiments, the printer driver software produces a print job and/or document based on an image and/or document data. In addition, the printer driver software can control transmission of the print job from the client device 160 to the host device 110, for example, in the form of a multifunction printer or printer.

In accordance with an exemplary embodiment, the host device 110 and the client device 160 can be connected with a USB connection 200 (Universal Serial Bus connection). In accordance with an exemplary embodiment, the USB connection 200 can be a wire, a cable, a connector and/or a communication protocol used in a bus for connection, and power supply between the host 110 and the device 160.

In accordance with an exemplary embodiment, FIG. 1 shows an exemplary example of manual key configuration for a system 100, which utilizes an IPsec framework or protocol as disclosed herein. Although FIG. 1 shows a manual key configuration for setting the IPsec framework for the host device 110 and the client device 160, automatic key configuration can be performed in place of the manual key configuration.

In accordance with an exemplary embodiment, as shown in FIG. 1, an IPsec policy configuration can be set for each of devices 110, 160. For example, as shown in FIG. 1, the host device 110 and the client device 160 can be configured with the following interfaces and network information by an application 120, 170. The interface and network information can include:

a) host device 110: Interface: lo:2 (first loopback interface) and IP address: 127.0.0.2; and b) client device 160: Interface: lo:3 (second loopback interface) and IP address: 127.0.0.3

In accordance with an exemplary embodiment, IPsec for each of the devices 110, 160 can be set with manual key configuration, for example, by using Setkey, Raccoon, or any other available tool. In accordance with an exemplary embodiment, a host application 120 and a client application 170, which are hosted on the host device 110 and at the client device 160, respectively, can set the following:

```
setkey -c
  add 127.0.0.2 127.0.0.3 esp 500 -E 3des-cbc
"beebeebeebeebeebee...."
  add 127.0.0.3 127.0.0.2 esp 600 -E 3des-cbc "beefbeefbeefbeef....."
  spdadd 127.0.0.2 127.0.0.3 any -P out IPpsec esp/transport//require;
```

In accordance with an exemplary embodiment, the host application 160 on the host device 110 can use a first loopback interface 130 (lo:2) to send a packet (HTTP/IPP packet request) 140 to a second loopback interface 180 (lo:3) hosted on the client device 160. The first loopback interface 130 (lo:2) on the host device 110 configures the packet 140 to be routed to the second loopback interface 180 (lo:3) on the client device 160. The packet 140 including USB data can then be configured to be transmitted over the USB connection 200. In accordance with an exemplary embodiment, the next header in the IP header, for example, 0x3D, can be used, however other IANA (Internet Assigned Numbers Authority) defined protocols can be used. In use, the IP next header field indicates what upper-layer protocol is protected. For example, in the present disclosure, 0x3D describes any host internal protocol. However, any protocol can be defined since the packet will be processed by the device application 170 rather than by the described network protocol.

In accordance with an exemplary embodiment, when IPsec is enabled on the host device 110, the packet arrives 140 at the IPSec module 132 and can be encrypted using IPsec protocol. A network filter 134, can then be used to filter the packet 142 destined to the second loopback interface (lo:3) 180 on the device application 170 of the client device 160. The host application 120 then sends the encrypted packet 142 through the USB connection 200 to the client device 160.

The application 170 on the client device 160 receives the USB data and injects the packet 142 to the second loopback interface 180 (lo:3). The encrypted packet 142 arrives at the IPsec module 182 and is decrypted. The decrypted packet 140 can then be sent to the second loopback interface 180 (lo:3) on the client device 160 where the device application 170 receives the packet. The HTTP/IPP packet 140 can then be processed and a response can be sent back to the device application 170.

Figure 2:
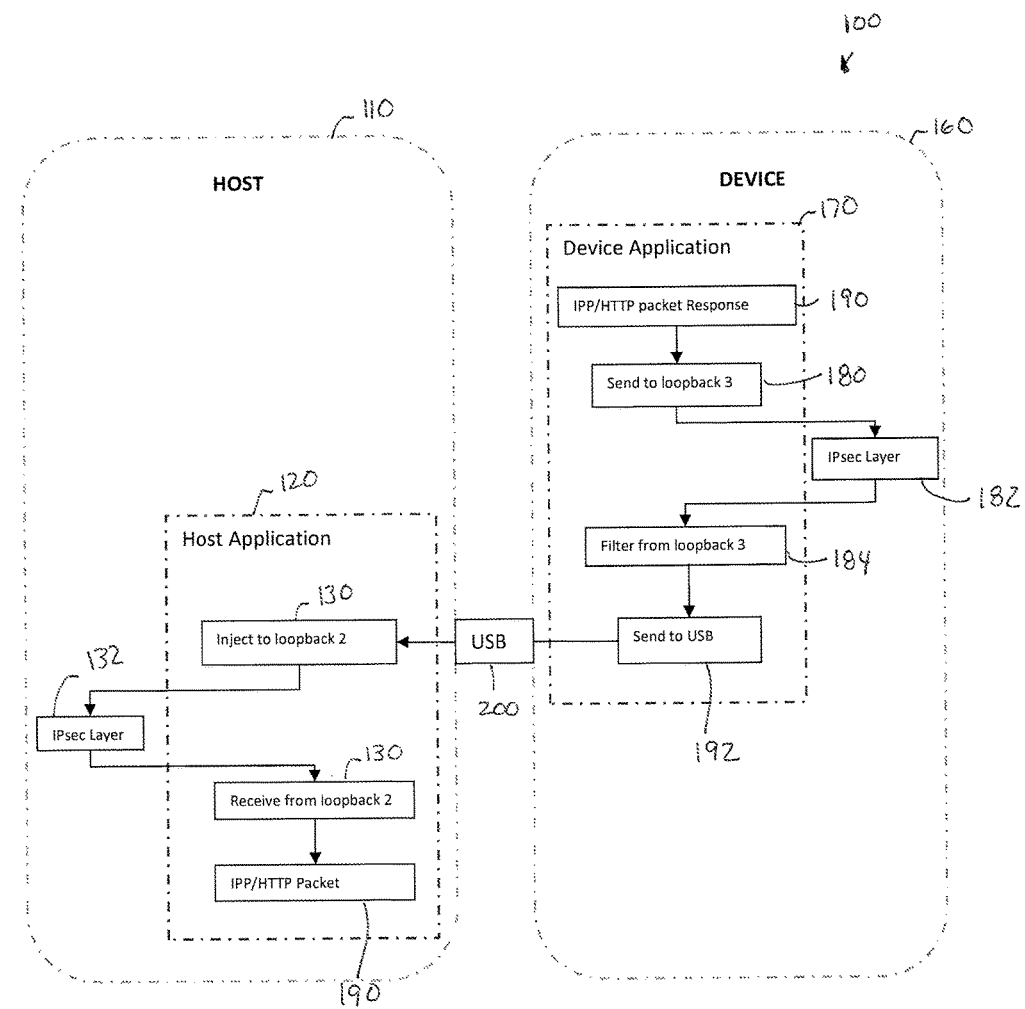
FIG. 2 is an illustration of the manual key configuration for IPSec having automatic key configuration from the client device to the host device in accordance with an exemplary embodiment.

FIG. 2 is an illustration of the manual key configuration for IPSec having automatic key configuration from the client device to the host device in accordance with an exemplary embodiment. As shown in FIG. 2, the device application 160 can send a packet, for example, an IPP/HTTP packet response having print data 190 to the first loopback interface 130 (lo:2) on the host device 110 for printing using the second loopback interface 180 (lo:3). In accordance with an exemplary embodiment, the IPP/HTTP packet 190 arrives at the IPsec module 182 and can be encrypted. In accordance with an exemplary embodiment, the application, for example, can use a netfilter 184 to filter the encrypted packet 192 from second loopback interface 180 (lo:3) and then sends the packet 192 to the USB connection 200. The host application 120 can then inject the encrypted packet 192 to first loopback interface 130 (lo:2). In accordance with an exemplary embodiment, the packet 190 can be decrypted by the IPsec module 132. The application filters can then decrypted the packet 190 destined for first loopback interface 130 (lo:2) to obtain the print data from the client device 160. For example, in accordance with an exemplary embodiment, the print data can then be processed by the host device 110.

In accordance with an exemplary embodiment, the system and method as disclosed herein, for transfer of data over a USB connection, can also be applied to other type of security protocols, for example, the method can be used to transfer data from any protocol in the application layer, for example, HTTP, LDAP, and/or DNS. In accordance with an exemplary embodiment, the host device 110 and the client device 160 can be configured with the same security configuration, each of the devices 110, 160 can include an application and loopbacks as disclosed herein for the secure transfer of data over a USB connection 200.

In accordance with an exemplary embodiment, a non-transitory computer readable medium containing a computer program having computer readable code embodied to carry out a method of providing security for data being transferred over a Universal Serial Bus (USB) connection is disclosed, the method comprising: setting an IPsec policy configuration on a host device and a client device, the IPsec policy configuration including a first loopback interface and an IP address for the host device and a second loopback interface and an IP address for the client device; sending a packet to the first loopback interface on the host device, wherein the first loopback interface configures the packet to be routed to the second loopback interface; sending the packet from the first loopback interface to an IPsec module on the host device for encryption; filtering the packet received from first loopback interface; sending the packet to the client device over the USB connection; injecting the packet into the second loopback interface on the client device; sending the packet from the second loopback interface on the client device to the IPsec module on the client device for decryption; and sending the decrypted packet to the second loopback interface on the device application, wherein the packet is received on the client device.

The computer readable recording medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of providing security for data being transferred over a Universal Serial Bus (USB) connection, the method comprising:
    setting an IPsec policy configuration on a host device and a client device, the IPsec policy configuration including a first loopback interface and an IP address for the host device and a second loopback interface and an IP address for the client device;
    sending an IP packet to the first loopback interface on the host device, wherein the first loopback interface configures the packet to be routed to the second loopback interface;
    sending the IP packet from the first loopback interface to an IPsec module on the host device for encryption pursuant to IPsec protocol;
    filtering the encrypted packet received from the first loopback interface on the host device and configuring the encrypted packet to be sent via USB protocol over the USB connection to the client device from the host device;
    sending the encrypted packet from the host device to the client device over the USB connection;
    injecting the encrypted packet into the second loopback interface on the client device;
    sending the encrypted packet from the second loopback interface on the client device to the IPsec module on the client device for decryption; and
    sending the decrypted packet to the second loopback interface on the client device, wherein the packet is received on the client device.

2. The method of claim 1, comprising:
    setting the IPsec policy configuration with a manual key configuration.

3. The method of claim 1, comprising:
    setting the IPsec policy configuration with an automatic key configuration.

4. The method of claim 1, wherein the IP packet is an HTTP/IPP packet.

5. The method of claim 1, comprising:
    sending an IP response packet to the second loopback interface on the client device, wherein the second loopback interface configures the IP response packet to be routed to the first loopback interface on the host device;
    sending the response packet to an IPsec module on the client device for encryption pursuant to the IPsec protocol;
    filtering the encrypted response packet received from the IPsec module on the client device and configuring the encrypted response packet to be sent via the USB protocol over the USB connection to the host device;
    sending the encrypted response packet to the host device over the USB connection;
    injecting the encrypted response packet into the first loopback interface;
    sending the encrypted response packet to the IPsec module on the host device for decryption; and
    receiving the decrypted response packet from the IPsec module on the host device and filtering the response packet.

6. The method of claim 5, wherein the host device is a printer and the client device is a personal computer, and further comprising:
    attaching print data to the encrypted response packet.

7. The method of claim 1, comprising:
    hosting the first loopback interface on a host application on the host device, and hosting the second loopback interface on a device application on the client device.

8. A non-transitory computer readable medium containing a computer program having computer readable code embodied to carry out a method of providing security for data being transferred over a Universal Serial Bus (USB) connection, the method comprising:
    setting an IPsec policy configuration on a host device, the IPsec policy configuration including a first loopback interface and an IP address for the host device;
    sending an IP packet to the first loopback interface on the host device, wherein the first loopback interface configures the packet to be routed to a second loopback interface on a client device, wherein the second loopback interface on the client device is configured to decrypt the packet;
    sending the packet from the first loopback interface to an IPsec module on the host device for encryption pursuant to IPsec protocol;
    filtering the encrypted packet received from first loopback interface on the host device and configuring the encrypted packet to be sent via USB protocol over the USB connection to the client device from the host device; and
    sending the encrypted packet to the client device over the USB connection.

9. The medium of claim 8, comprising:
    setting the IPsec policy configuration with a manual key configuration.

10. The medium of claim 8, comprising:
    setting the IPsec policy configuration with an automatic key configuration.

11. The medium of claim 8, wherein the IP packet is an HTTP/IPP packet.

12. A non-transitory computer readable medium containing a computer program having computer readable code embodied to carry out a method of providing security for data being transferred over a Universal Serial Bus (USB) connection, the method comprising:
    setting an IPsec policy configuration on a client device, the IPsec policy configuration including a second loopback interface and an IP address for the client device;
    receiving an encrypted packet on the client device over the USB connection from a host device, the encrypted packet encrypted on the host device pursuant to IPsec protocol and configured via USB protocol to be sent over the USB connection to the client device;

injecting the encrypted packet into the second loopback interface on the client device;

sending the encrypted packet from the second loopback interface on the client device to the IPsec module on the client device for decryption; and sending the decrypted packet to the second loopback interface on the client device, wherein the decrypted packet is received on the client device.

13. A system for providing security for data being transferred over a Universal Serial Bus (USB) connection, the system comprising:

a USB connection;

a host device, the host device having a host application configured with an IPsec policy including a first loopback interface and an IP address for the host device; and a client device, the client device having a device application configured with the IPsec policy including a second loopback interface and an IP address for the client device, and wherein the host device and the client device are configured to:

send an IP packet to the first loopback interface on the host device, wherein the first loopback interface configures the packet to be routed to the second loopback interface;

send the packet from the first loopback interface to an IPsec module on the host device for encryption pursuant to IPsec protocol;

filter the encrypted packet received from the first loopback interface on the host device and configure the encrypted packet to be sent via USB protocol over the USB connection to the client device from the host device;

send the encrypted packet to the client device over the USB connection;

inject the encrypted packet into the second loopback interface on the client device;

send the encrypted packet from the second loopback interface on the client device to the IPsec module on the client device for decryption; and send the decrypted packet to the second loopback interface on the device application, wherein the packet is received on the client device.

14. The system of claim 13, wherein the IPsec policy configuration is set with a manual key configuration on the host device and the client device.

15. The system of claim 13, wherein the IPsec policy configuration is set with an automatic key configuration on the host device and the client device.

16. The system of claim 13, wherein the host device and the client device are configured to:

send an IP response packet to the second loopback interface on the client device, wherein the second loopback interface configures the response packet to be routed to the first loopback interface on the host device;

send the response packet to an IPsec module on the client device for encryption pursuant to the IPsec protocol;

filter the encrypted response packet received from the IPsec module on the client device and configuring the encrypted response packet to be sent via the USB protocol over the USB connection to the host device;

send the encrypted response packet to the host device over the USB connection;

inject the encrypted response packet into the first loopback interface;

send the encrypted response packet to the IPsec module on the host device for decryption; and receive the decrypted response packet from the IPsec module on the host device and filtering the response packet.

17. The system of claim 16, wherein the host device is a printer and the client device is a personal computer, and the response packet has print data.

18. The system of claim 13, wherein the first loopback interface is hosted on the host application on the host device, and the second loopback interface is hosted on the device application on the client device.

19. The medium of claim 8, comprising:

receiving an encrypted response packet over the USB connection from the second loopback interface on the client device;

injecting the encrypted response packet into the first loopback interface;

sending the encrypted response packet to the IPsec module on the host device for decryption; and receiving the decrypted response packet from the IPsec module and filtering the decrypted response packet.

20. The medium of claim 12, comprising:

sending a response packet to the second loopback interface on the client device, wherein the second loopback interface configures the response packet to be routed to a first loopback interface on a host device;

sending the response packet to an IPsec module on the client device for encryption pursuant to the IPsec protocol;

filtering the encrypted response packet received from the IPsec module on the client device and configuring the encrypted response packet to be sent via the USB protocol over the USB connection to the host device; and sending the encrypted response packet to the host device over the USB connection.

* * * * *